Dec. 16, 1924.
H. R. DE VEAU
1,519,824
ADJUSTABLE DRIVING SEAT
Filed March 10, 1923  2 Sheets-Sheet 1
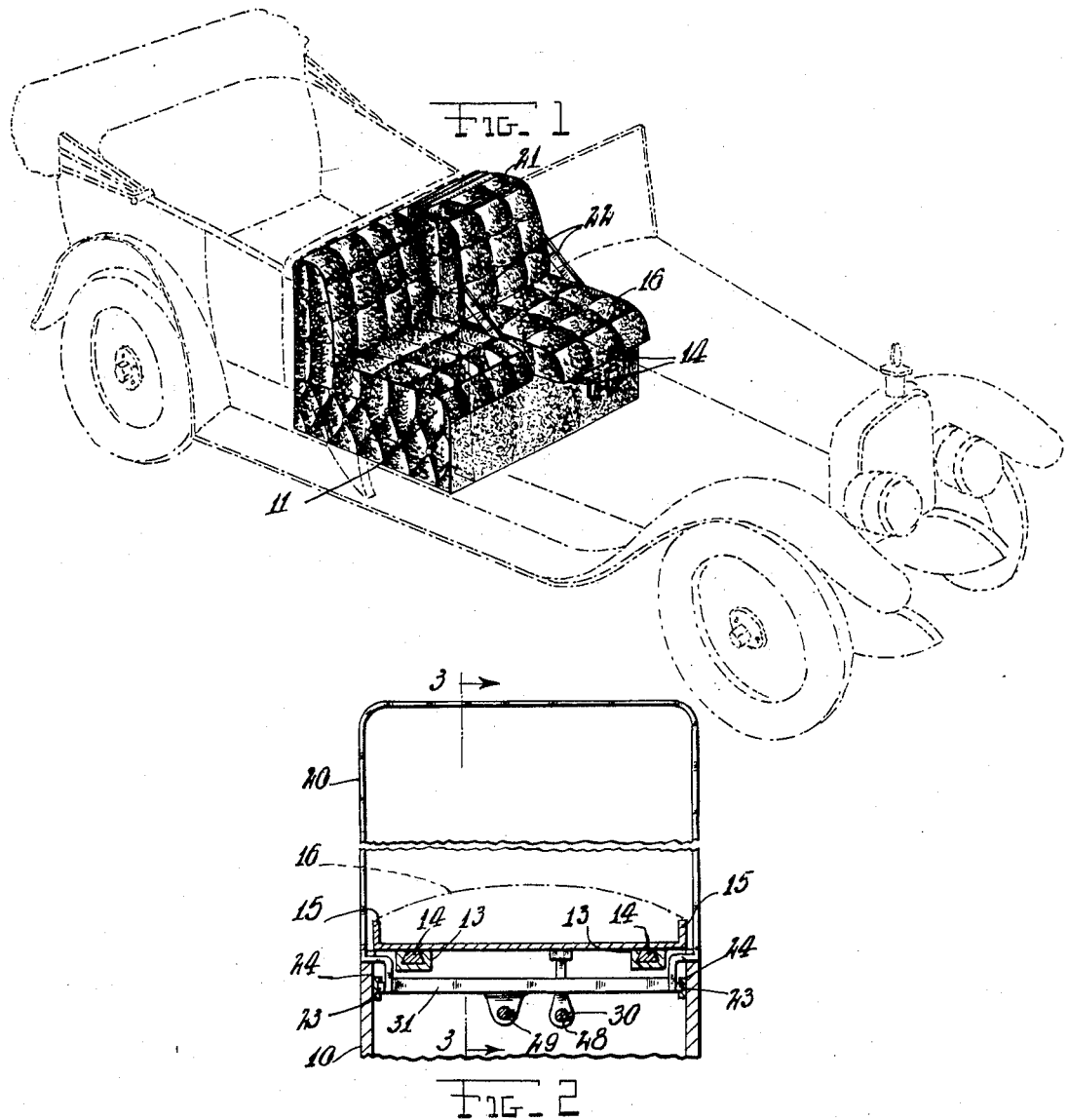
Inventor
Harry R. De Veau
By Solken H. Polachek
Attorney Dec. 16, 1924.
H. R. DE VEAU
ADJUSTABLE DRIVING SEAT
Filed March 10, 1923 2 Sheets-Sheet 2
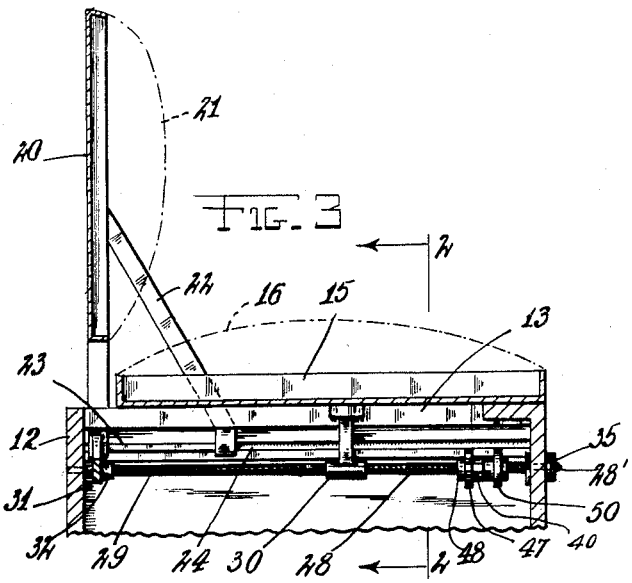
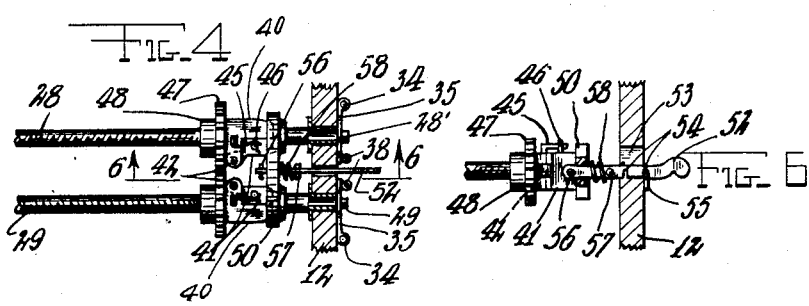
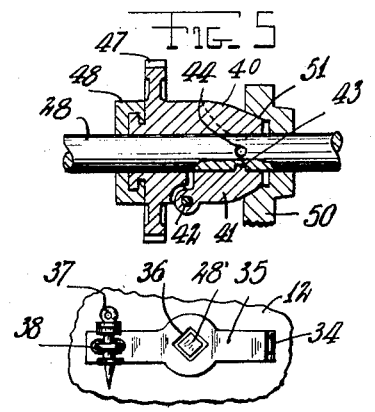
Inventor
Harry R. De Veau
By
Attorney Patented Dec. 16, 1924.

1,519,824

UNITED STATES PATENT OFFICE.

HARRY R. DE VEAU, OF MOUNT VERNON, NEW YORK.

ADJUSTABLE DRIVING SEAT.

Application filed March 10, 1923. Serial No. 624,133.

*To all whom it may concern:*

Be it known that I, HARRY R. DE VEAU, a citizen of the United States, residing at Mount Vernon, in the county of Westchester and State of New York, have invented certain new and useful Improvements in Adjustable Driving Seats, of which the following is a specification.

This invention relates generally to automobiles or like vehicles, having more particular reference to the arrangement of the seat for the driver, the invention having for an object to provide a simplified and novel arrangement of parts whereby the said seat may be adjusted backward or forward to suit tall or short drivers, the invention having for a further specific object the provision of means for moving the seat proper either in unison with or independently of the seat back.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view showing my improved adjustable seat as applied to an automobile.

Fig. 2 is a transverse vertical sectional view thereof, this view being taken on the line 2—2 of Fig. 3.

Fig. 3 is a longitudinal vertical sectional view thereof taken on the line 3—3 of Fig. 2.

Fig. 4 is a detail plan view with parts in horizontal section showing the means for changing from independent to unitary adjustment of the seat and its back.

Fig. 5 is a fragmentary longitudinal sectional view of the means shown in Fig. 4.

Fig. 6 is a like view taken on the line 6—6 of Fig. 4.

Fig. 7 is a detail face view showing one of the shaft locking hasps.

To support my improved seat I provide a pair of side boards 10 which extend along the opposite sides of the seat proper, the front seat of the automobile being here indicated as formed in two sections of which one, indicated at 11, is fixed, the other being for the driver and being adjustable according to my invention, it being understood that the side boards 10 are under the sides of this adjustable section. These side boards 10 are rigidly connected by end boards 12, forming an open frame on which the seat is supported. Extending along the top of this frame are a pair of channeled guide bars 13 which are fixed at opposite ends in the end boards 12 and which are formed with dovetail grooves therein in which engage tongues 14 formed on the lower face of the frame element 15 of the seat proper, which may be provided with the usual upholstery indicated at 16.

For supporting the back of the seat I provide a transverse frame element 20 to which the usual upholstery 21 is attached, this frame element being formed with a pair of downwardly extended rigid straps 22 on each side which are bent at their lower ends to project downwardly inside the confines of the seat frame and have tongues 23 fastened to their lower ends engaging freely in channeled guides 24 fixed to the side boards 10 whereby the back element is slidably supported.

For adjustment of the seat and back elements I provide a pair of screw shafts 28 and 29 respectively which extend longitudinally under the seat element and are suitably journaled at their ends in the end boards 12. Depending from the seat frame 15 is a threaded member or nut 30 through which the shaft 28 passes, while a cross bar 31 extends rigidly between the opposed straps 22 and has the shaft 29 threaded through a boss providing a nut 32 in its centre. The shafts 28 and 29 are projected at their front ends through the front board 12 and have squared ends 28' and 29' adapted to receive the end of a turning tool. To lock these shafts against rotation I may hinge as at 34 to the front board a pair of hasps 35 having square apertures such as 36 therein through which the ends of the shafts project. These hasps may be held in place by pins 37 passed through staples 38 in the front board 12.

In order to enable both shafts to be rotated simultaneously, if it is desired to adjust the seat and back elements as a single unit, I provide the means illustrated in detail in Figs. 4, 5 and 6. As there shown a pair of sleeves 40 are freely mounted on unthreaded portions of the respective shafts near the ends thereof, these sleeves being cut out part way along one side and having supplementary sections 41 hinged thereto as at 42 which fill the cut out parts, these supplementary sections having each a pin 43 thereon adapted to engage in any one of a number of sockets 44 spaced around the shaft, the section 41 being normally urged to a position with the pin 43 free of the socket by a spring 45 on the main body of the sleeve and bearing on a pin 46 projecting from the section 41. Fixed co-axially to the respective sleeves 40 are gears 47 which mesh with one another. The sleeves 40 may be held against longitudinal movement on their shafts by means of collars 48 fixed to said shafts and suitably engaged with said gears.

To move the hinged sections inward against the shafts I provide a crosshead 50 which is slidable on both shafts and which is formed with a pair of tapered recesses 51 into which the ends of the sleeves, which are correspondingly tapered, may be projected by moving the said crosshead along the shafts. For moving this crosshead a latch arm 52 is provided and extends both inward through a slot in the crosshead and outward through a slot 53 in the front end board 12 and is formed on its underside with a pair of longitudinally spaced notches 54 either one of which may be engaged by a lip 55 on the bottom wall of the slot 53. Fixed to the arm 52 one on each side of the crosshead 50 are pins 56 and 57 while an expansion spring 58 bears between the pin 57 and the crosshead. As will be understood, when the latch arm 52 is pulled outwardly the crosshead 50 is disengaged from the sleeve members 40 and 41 and in consequence the gears 47 are loose on their respective shafts so that individual adjustment of the seat and back elements may be effected. When the seat and back elements are to be adjusted in unison the arm 52 is pushed inwardly. If the pins 43 should not be in registry with the sockets in the shaft the spring 58 will compress, and when one shaft is turned the pins will snap successively into their sockets.

While I have illustrated and described a preferred embodiment of my invention it will be understood that I do not limit myself to the precise construction herein disclosed and that the right is reserved to all changes and modifications coming within the spirit and scope of the invention as defined in the appended claims.

Having thus described my invention what I claim as new and desire to protect by Letters Patent of the United States is as follows:

1. In a vehicle, a seat, a separate back for said seat, guides for said seat and back to permit of forward or backward adjustment thereof, and means for moving said seat and back either independently of one another or as a unit along said guides.

2. In a vehicle, a seat, a separate back for said seat, guides for said seat and back to permit of forward or backward adjustment thereof, and means for moving said seat and back either independently of one another or as a unit along said guides, said means including a pair of screw shafts and nut elements fixed to the back and seat and engaged with the respective shafts.

3. In a vehicle, a seat, a separate back for said seat, and means for adjusting said seat either independently or in unison with said back, said means comprising a pair of screw shafts having an engagement respectively with the seat and back, a pair of sleeves rotatable but not axially movable one on each shaft, means operatively connecting said sleeves together whereby they will rotate in unison, and means for locking said sleeves to their respective shafts.

4. In a vehicle, a seat, a separate back for said seat, and means for adjusting said seat either independently or in unison with said back, said means comprising a pair of screw shafts having an engagement respectively with the seat and back, a sleeve rotatable but not axially movable on each shaft, and having supplementary sections hinged thereto adapted to grip the shafts, and means for moving said supplementary sections into gripping relation to the said shafts, said last means comprising an element formed with eyes in its ends through which the shafts pass and which engage over the tapered ends of the said sleeves.

5. In a vehicle, a seat, a separate back for said seat, and means for adjusting said seat and back in a forward or rearward direction either independently of one another or as a unit.

In testimony whereof I have affixed my signature.

HARRY R. DE VEAU.